United States Patent [19]
Dixon et al.

[11] Patent Number: 5,635,273
[45] Date of Patent: Jun. 3, 1997

[54] THERMALLY FUSED THERMOPLASTIC HONEYCOMB STRUCTURES

[75] Inventors: Doyle G. Dixon, Walnut Creek; Peter G. Turner, Oakley, both of Calif.

[73] Assignee: Hexcel Corporation, Pleasanton, Calif.

[21] Appl. No.: 447,622

[22] Filed: May 23, 1995

Related U.S. Application Data

[62] Division of Ser. No. 105,763, Aug. 11, 1993, Pat. No. 5,421,935, which is a continuation of Ser. No. 730,267, Jul. 12, 1991, abandoned.

[51] Int. Cl.$^6$ .................................................. B32B 3/12
[52] U.S. Cl. ................... 428/116; 52/793.1; 156/197; 428/118
[58] Field of Search ........................... 428/116, 118; 52/793.1; 156/197; 493/966

[56] References Cited

U.S. PATENT DOCUMENTS

| | | | |
|---|---|---|---|
| 2,423,870 | 7/1947 | Blessing | 428/116 |
| 2,581,421 | 1/1952 | Lombard et al. | 428/116 X |
| 2,722,735 | 11/1955 | Beamish | 428/116 X |
| 3,106,503 | 10/1963 | Randall et al. | 428/117 X |
| 3,493,450 | 2/1970 | Judge, Jr. | 156/197 |
| 3,660,217 | 5/1972 | Kehr et al. | 428/118 |
| 3,715,251 | 2/1973 | Prentice | 428/198 X |
| 3,765,974 | 10/1973 | Petersik et al. | 428/198 X |
| 3,886,023 | 5/1975 | DePlante | 428/117 X |
| 3,949,651 | 4/1976 | Spencer | 428/116 X |
| 4,180,897 | 1/1980 | Chester | 156/197 X |
| 4,313,776 | 2/1982 | Urai et al. | 428/198 X |
| 4,315,050 | 2/1982 | Rourke | 428/116 |
| 4,641,726 | 2/1987 | Fearon | 428/116 X |
| 4,797,173 | 1/1989 | Gross et al. | 156/498 |
| 4,957,577 | 9/1990 | Huebner | 428/116 X |
| 4,992,132 | 2/1991 | Schmidlin et al. | 156/197 X |
| 5,002,628 | 3/1991 | Schnebly | 156/379 |
| 5,039,567 | 8/1991 | Landi et al. | 428/116 |
| 5,252,163 | 10/1993 | Fell | 428/118 X |

FOREIGN PATENT DOCUMENTS 0336721  11/1989  European Pat. Off. .
0336722  11/1989  European Pat. Off. .

*Primary Examiner*—Henry F. Epstein
*Attorney, Agent, or Firm*—Oppenheimer Poms Smith

[57] ABSTRACT

A method and apparatus for forming a honeycomb structure in which a plurality of thermoplastic layers are fused together at selected locations. The thermoplastic layers at each of the selected locations are melted together to form a welded portion which includes first and second exterior surfaces. The welding of the thermoplastic layers is controlled so that no more than one of the exterior surfaces is melted. This partial melting of one layer prevents undesirable welding to adjacent layers. An apparatus for carrying out the method for welding thermoplastic honeycomb structures is also disclosed.

10 Claims, 2 Drawing Sheets

THERMALLY FUSED THERMOPLASTIC HONEYCOMB STRUCTURES

RELATED APPLICATION

This is a division of application Ser. No. 08/105,763 filed on Aug. 11, 1993, now issued as U.S. Pat. No. 5,421,935, which was a continuation application of Ser. No. 07/730,267 filed on Jul. 12, 1991, and now abandoned.

BACKGROUND OF THE INVENTION

1. Field of the Invention

The present invention relates generally to methods and apparatus for manufacturing honeycomb structures. More particularly, the present invention relates to an improved method and apparatus for manufacturing thermally fused honeycomb structures.

2. Description of Related Art

Honeycomb core materials are widely used in industry due to their light weight and unique structural characteristics. Honeycomb cores made from relatively thin gauge thermoplastic sheets are especially useful because they are lightweight and provide flexible structures which can withstand high compression loads. Such honeycomb structures are commonly found in applications as diverse as aircraft components and running shoes.

There are a variety of ways to manufacture honeycomb cores. One common method of manufacture is typified by U.S. Pat. No. 3,660,217, issued to Kehr et al. This method entails the formation of lines of adhesive onto sheets of material arranged in a stack. The line pattern formed on each individual sheet is staggered in relation to the previous sheet. Once the adhesive lines are all in place, the stack is compressed and heated, if necessary, until the adhesive has fully cured. The resulting structure is commonly referred to as a honeycomb before expansion or stack.

In order to form the final honeycomb structure, the stack is expanded by applying a uniform outward force to the outermost sheets of the stack. Heat is usually applied during the expansion process in order to permanently set the thermoplastic in its final expanded honeycomb shape.

The use of adhesives to bond the honeycomb layers together is relatively simple and is acceptable for many applications. However, a variety of factors may contribute to uneven bonding which often yields less than desirable results. For example, when using heat-cured adhesives, which typically have a lower melting point than the melting point of the sheet material, the outermost sheets of the stack may receive an excess amount of heat, while the innermost sheets receive too little heat. As a consequence, uneven bonding throughout the structure may result. It is evident then, that the dissimilar adhesive material is usually the weak link in the structure, and when the stack is expanded, the weaker bond areas may come apart under the pressure of expansion and cause gaps or tears in the honeycomb structure. The present invention eliminates the weak link associated with adhesive bonding of the sheets by providing a fused bond zone formed directly in the adjoining honeycomb layers which exhibits properties substantially identical to the properties of the honeycomb material.

Another technique for manufacturing honeycomb structures involves using weld bonds in place of adhesives. In general, this procedure involves forming the stack by sequentially welding one layer of thermoplastic material to the stack at a time. It is essential that the top sheet which is being welded to the underlying stack of layers be welded only to the uppermost layer of the stack. Inadvertent welding of the underlying layers prohibits the expansion necessary to form the honeycomb structure.

In order to prevent inadvertent welding of the underlying layers, various protective inserts are placed directly beneath the weld location. These protective inserts are typically referred to as "fingers" and are designed to prevent the top two layers which are being welded together from sticking to the remainder of the stack. U.S. Pat. No. 4,957,577 issued to Huebner, discloses an exemplary procedure which utilizes protective fingers.

The protective fingers work well in welding processes to prevent bonding of the uppermost layers to the body of the stack. However, use of the protective fingers is undesirable in that they must be inserted underneath each weld line. This is a time consuming process and, if a finger is inadvertently left out, the two uppermost layers are welded to the underlying stack. The result is a partially blocked honeycomb structure. In addition, the fingers must be removed once the stack is expanded. This can present problems, especially when the lateral dimensions of the honeycomb are large.

As is apparent from the above, it would be desirable to eliminate the need for protective fingers when welding the thermoplastic layers together while still providing adequate weld bonds.

SUMMARY OF THE INVENTION

In accordance with the present invention, it was discovered that honeycomb structures can be made from thermoplastic materials utilizing weld bonds without using protective fingers during the welding process. The invention is based upon the discovery that welding of the thermoplastic layers together can be controlled so that only the top two layers are bonded during the welding operation. It was further discovered that a strong structural weld or fusion bond could be obtained even though both layers are not completely melted during the welding process.

The present invention involves a method for forming a honeycomb structure wherein a plurality of thermoplastic layers are welded together at selected locations so that the welded layers will form a honeycomb structure when they are expanded apart. The thermoplastic layers at each of the weld locations are melted together to form a welded portion which includes first and second exterior surfaces. As a feature of the present invention, the melting of the thermoplastic layers during the welding step is controlled so that no more than one of the exterior surfaces is melted. As a result, the two layers being welded do not stick or otherwise bond to the underlying previously welded layers.

The method in accordance with the present invention provides for strong thermoplastic honeycomb bonds at weld locations without the requirement of using protective fingers during the welding process. As a feature of the present invention, it was discovered that the degree of melting can be controlled accurately by rapidly cooling the layers being welded after the desired weld penetration has been achieved. It was found that weld penetration wherein about 75% of the combined thickness of the two layers is melted provides strong structural bonding while substantially avoiding any possibility of inadvertent bonding to underlying layers.

As another feature of the present invention, an apparatus is described which provides the controlled melting necessary to carry out the method of the present invention. The apparatus is based upon conventional heating grids used to weld thermoplastic stacks which are then used to form thermoplastic honeycombs. As a feature of the present invention, a chilling plate is provided which is used to rapidly cool the stack immediately after welding. This minimizes migration of the melt zone into the underlying layers and prevents undesirable welding of the layers.

The above-described and many other features and attendant advantages of the present invention will become apparent as the invention becomes better understood by reference to the following detailed description when considered in conjunction with the accompanying drawing.

DETAILED DESCRIPTION OF THE INVENTION

The present invention has wide application to the formation of honeycomb structures from a variety of thermoplastic materials. The invention is applicable to any of the thermoplastics which may be used to form honeycomb structures. The present invention is an improvement upon existing methods for forming thermoplastic honeycomb structures wherein the various layers of the honeycomb are bonded together by fusing or welding. The formation of thermoplastic honeycomb structures involves first forming a laminated structure or stack which is also referred to as a honeycomb before expansion. The various thermoplastic layers of the stack are bonded together at selected locations so that when the stack layers are expanded apart, a honeycomb structure results.

Figure 1:
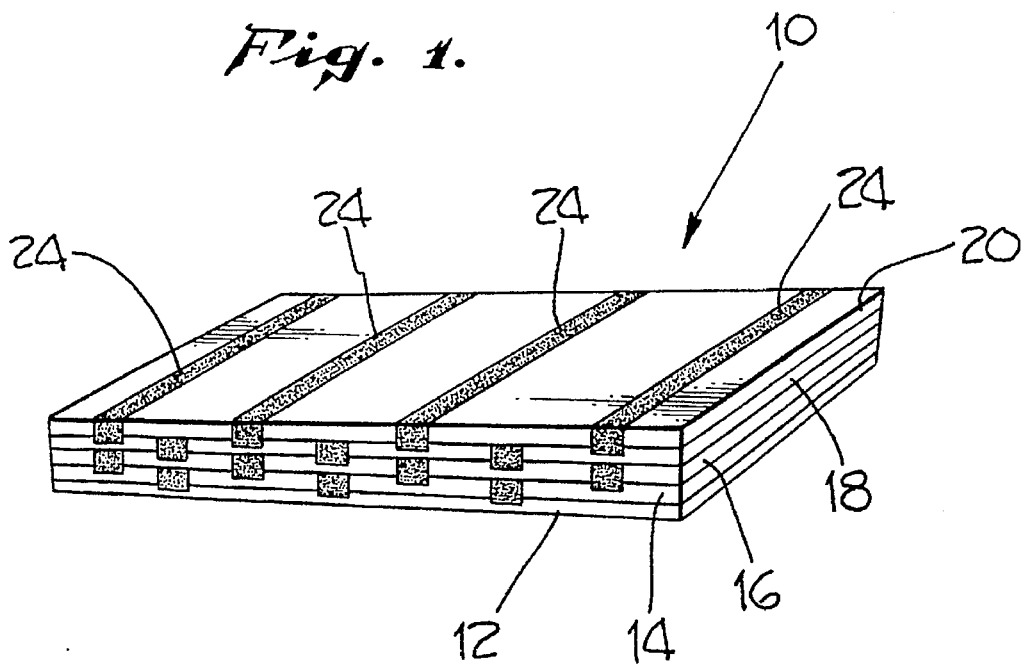
FIG. 1 is perspective view of a preferred stack in accordance with the present invention.

A preferred exemplary stack in accordance with the present invention is shown generally at 10 in FIG. 1. A final preferred exemplary honeycomb structure after expansion of the stack 10 is shown generally at 22 in FIG. 2. The stack 10 and honeycomb structure 22 in accordance with the present invention may be fabricated utilizing any of the known thermoplastic materials which are amenable for use in honeycomb structures. Thermoplastic materials, such as polyurethane, which can be melted and fused or welded together to provide strong bonds are preferred. Other suitable thermoplastics include vinyls, ABS, polypropylene and polyethylene. Also included are the engineered thermoplastics, examples of which are polyether imide, polyarylene sulfide, polyarylene ether, polyether ether ketone and others.

The stack 10 shown in FIG. 1 includes five thermoplastic layers 12, 14, 16, 18 and 20. The layers are welded together at selected locations which are depicted as the stippled areas in the stack 10. Referring to the two uppermost thermoplastic layers 18 and 20, the welded regions are shown by stippling at 24. The stippling 24 represents the portion of the thermoplastic layers 18 and 20 which is melted during the welding process in accordance with the present invention. The melted region extends entirely through the upper layer 20 and into a substantial portion of the lower layer 18. A principal feature of the present invention is that the melted region 24 does not extend past layer 18 into the underlying layers 16, 14 and 12.

Figure 2:
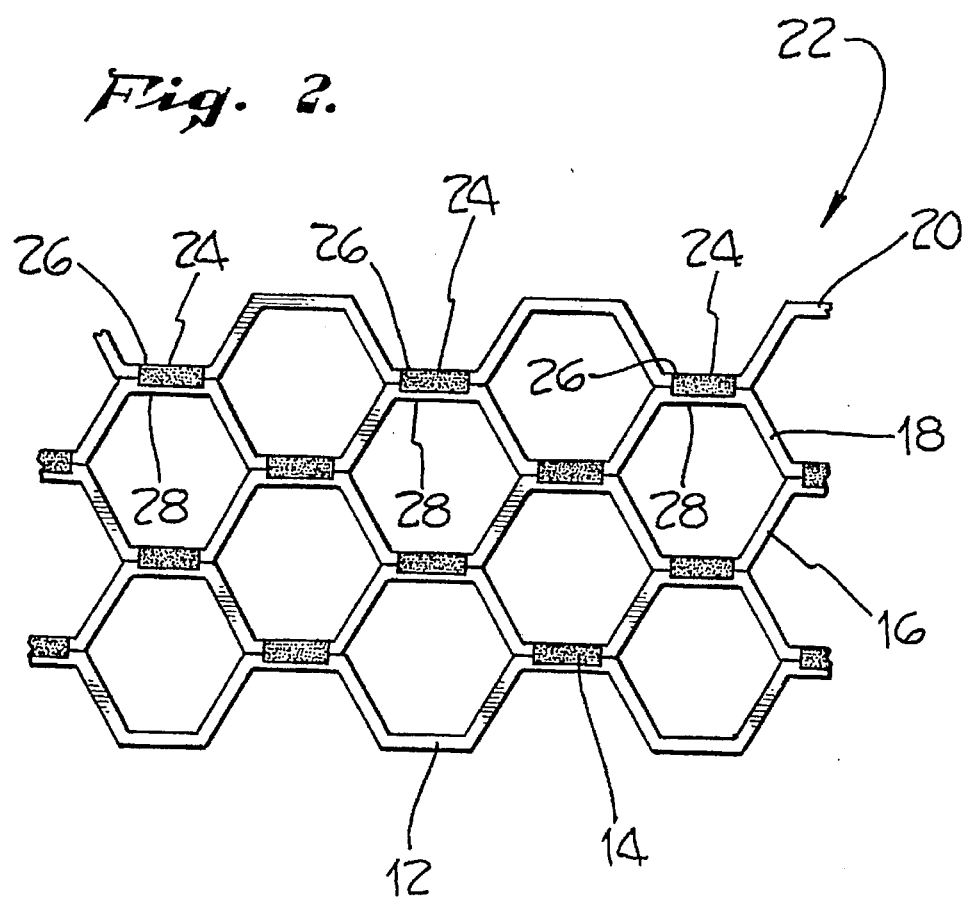
FIG. 2 is a partial side view of the stack shown in FIG. 1 after it has been expanded to form a honeycomb.
Figure 3:
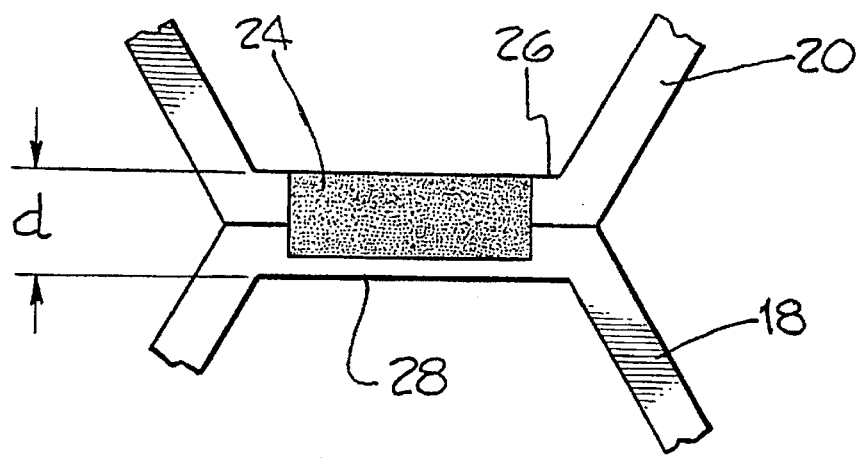
FIG. 3 is a detailed view of a portion of honeycomb shown in FIG. 2.

Referring to FIG. 2, the layers 12, 14, 16, 18 and 20 are shown after expansion into the honeycomb structure. A detailed view of one of the weld or fusion bonds between layers 18 and 20 is shown in FIG. 3. As can be seen from FIG. 3, the layers 18 and 20 are melted together at a selected location to form a welded portion which includes an upper or first exterior surface 26 and a lower or second exterior surface 28. The overall thickness of the two layers 18 and 20 at the welded portion is indicated by "d" in FIG. 3. The thickness "d" is the distance between the top surface 26 and the bottom surface 28 of the welded portion.

In accordance with the present invention, it is preferred that the melting of the two thermoplastic layers 18 and 20 be controlled during the welding process so that no more than 95% of the thickness "d" is melted. Particularly preferred is a melting of approximately 75% of the thickness "d". In all cases, the melting is conducted in one direction only so that only one of the two surfaces 26 or 28 is melted. In the normal method for manufacturing stacks where layers are sequentially stacked on top of each other, the melting will progress from the top surface 26 down towards the bottom surface 28.

Although any number of welding techniques may be utilized, it is preferred that the heat be applied to upper surface 26 by way of a heated grid. The use of such heated grids is widely known in thermoplastic fusion or welding. For thermoplastics such as polyurethane, the temperature of the heated grid will be in the range of about 350–400° F. The heated grid is placed in contact with the upper surface 26 and kept there for a sufficient time to melt the layers 18 and 20 so that the melt zone progresses down to the desired depth of penetration, i.e. less than 95% of the thickness "d". The width of the heating grid lines are varied depending upon the desired width of the welded portion. Typically, heating gridlines are on the order of a few mils wide to about 0.50 inch (1.28 cm).

After the desired melt penetration is achieved, the heating grid is then removed and the layers allowed to cool. In order to rapidly arrest any further melting of the two layers and to prevent the possibility of melt migration down into underlying layers, it is preferred that a chill plate or other means for rapidly cooling the welded layers be utilized. The chill plate should be sufficiently cool to provide cooling of the welded layers to well below the thermoplastic range within no more than a few seconds after application of the chill plate. Other possible means for chilling the stack between weld operations include chilling by contact with cooling liquids, gases or chilled solids other than a chill plate.

Although the exemplary stack 10 shown in FIG. 1 includes only 5 layers, it is preferred that stacks having on the order of up to 200 layers and even more be made in accordance with the present invention. The use of the chill plate is especially preferred when large stacks are being manufactured since the residual weld heat produced during the welding of numerous layers can contribute to overall warming of the stack which makes accurate control of welding in accordance with the present invention more difficult.

The present invention may be used to make honeycomb structures wherein the layers have thicknesses ranging from a few mills to about 0.25 inch (0.64 cm). The present invention is not well-suited for preparing stacks utilizing thermoplastic materials having thicknesses less than 0.003 inch (0,007 cm), since layers which are that thin are difficult to weld without completely melting both layers during the welding process. Thermoplastic layers having thickness greater than 0.25 inch (0.64 cm) are difficult to fuse by welding and therefore are also not preferred.

Figure 4:
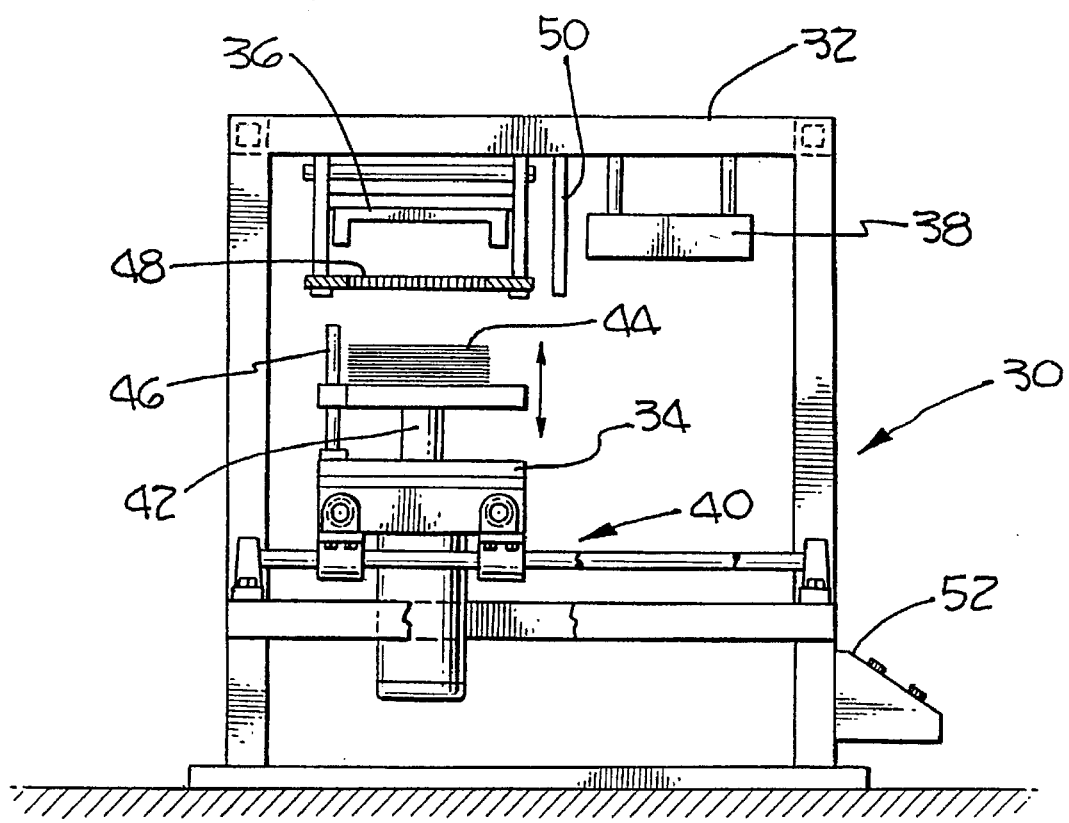
FIG. 4 is a partially schematic side view of a preferred exemplary apparatus for carrying out the method of the present invention.

An exemplary preferred apparatus in accordance with the present invention is shown schematically at 30 in FIG. 4. The apparatus includes a framework 32 in which the stack platform 34, heating grid 36 and chill plate 38 are mounted. The stack platform 34 is mounted on rails shown generally at 40 which are designed to allow the platform 34 to be moved alternately between positions underlying the heating grid 36 and chill plate 38.

The stack platform 34 includes a telescoping table 42. The table 42 has a top surface onto which the thermoplastic layers are positioned for welding. A partially formed stack 44 is shown in position on table 42. A positioner or fence 46 is provided to ensure accurate alignment of the layers as they are sequentially added onto the stack 44 for welding. The table 42 is shown in a retracted position in FIG. 4. The table 42 may be telescoped hydraulically or electrically into contact with heating grid 36. A compression grating 48 is provided to ensure that the various stack layers are uniformly pressed together during contact with heating grid 36. The compression grating 48 ensures that the heating grid 36 uniformly contacts the stack layers to be welded to ensure uniform melt penetration and welding in accordance with the present invention.

A heat shield 50 is provided between the heating grid 36 and chill plate 38. A control console 52 is provided which allows the operator to accurately control the temperature of heating grid 36 and other welding parameters, such as the pressure applied to the stack 44 by the compression grating 48 and heating grid 36. In addition, the contact time between the heating grid 36 and stack 44 is also controlled via the console 52.

After the welding step is completed, the stack platform 34 is transported on rails 40 to a position directly under chill plate 38. The telescopic table 42 is then raised so that the stack 44 contacts the chill plate 38 to provide rapid cooling. The various contact times and pressure between stack 44 and chill plate 38 are also controlled by console 52. The operator of the apparatus can accurately control the degree of melting by varying the various parameters of temperature, time and pressure to achieve welding in accordance with the present invention, i.e. fusion of two layers wherein only one layer is completely melted.

The parameters of heating grid temperature, heating grid-stack contact time, heating grid-stack contact pressure, chill plate temperature, chill plate-stack contact pressure and chill plate-stack contact time are varied by the apparatus operator depending upon the thermoplastic material being used, the thickness of the layers, the size of the stack and the degree of melt penetration desired. These parameters are all easily determined during start-up of a production run by measuring the degree of melt penetration and adjusting the parameters to achieve the desired melt penetration in accordance with the present invention.

For a stack made from layers of flexible polyurethane having thicknesses from about 0.005 inch (0.010 cm) to about 0.050 inch (0.12 cm), the following exemplary parameter ranges are preferred:

| | |
|---|---|
| heating grid temperature: | 350–450° F. |
| heating grid line size: | 0.25 in (0.64 cm) |
| heating grid/stack contact time: | 3 to 16 seconds |
| heating grid/stack contact pressure: | 50 to 105 psi |
| compression grating/stack contact pressure: | 55 to 65 psi |
| chill plate temperature: | 50 to 65° F. |
| chill plate/stack contact pressure: | 50 to 100 psi |
| chill plate/stack contact time: | 7 to 16 seconds |

The stacks which are formed in accordance with the present invention are then expanded by any of the known techniques to form the final bulk honeycomb structure. The bulk honeycomb structure may then be subjected to further fabrication steps, such as slicing into honeycomb sheets which are then sandwiched between side support layers. The expansion of stacks and further fabrication of bulk honeycomb structures into final products are well-known processes which will not be described in detail.

Having thus described exemplary embodiments of the present invention, it should be noted by those skilled in the art that the within disclosures are exemplary only and that various other alternatives adaptations and modifications may be made within the scope of the present invention. Accordingly, the present invention is not limited to the specific embodiments as illustrated herein, but is only limited by the following claims.

What is claimed is:

1. A stack of interconnected thermoplastic layers which is adapted for use in forming a honeycomb structure, said stack comprising:

a plurality of thermoplastic sheets which are layered on top of each other to form a stack of thermoplastic layers wherein each layer includes a top surface, a bottom surface and an interior and wherein the top surface of a lower thermoplastic layer within said stack is adjacent to the bottom surface of an upper adjacent thermoplastic layer within said stack; and a plurality of weld bonds located at spaced locations throughout said stack of thermoplastic layers, said weld bonds comprising regions of welded plastic, said regions of welded plastic extending from the top surface of an upper thermoplastic layer through the interior and bottom of said layer and through only the top surface and interior of an adjacent lower layer, said region of welded plastic not extending through the bottom surface of said adjacent lower layer.

2. A stack of interconnected thermoplastic layers according to claim 1 wherein the region of welded plastic located in the interior of said lower layer does not extend through more than 95% of the thickness of said interior.

3. A stack of interconnected thermoplastic layers according to claim 2 wherein the region of welded plastic located in the interior of said lower layer extends through approximately 75% of the thickness of said interior.

4. A stack of interconnected thermoplastic layers according to claim 1 wherein said thermoplastic layers comprise a thermoplastic selected from the group consisting of polyurethane, vinyl, acrylonitrile butadiene styrene, polypropylene, polyethylene, polyether imide, polyarylene sulfide, polyarylene ether and polyether ether ketone.

5. A stack of interconnected thermoplastic layers according to claim 4 wherein said thermoplastic layers comprise polyurethane.

6. A honeycomb structure comprising:

a plurality of thermoplastic sheets which are layered on top of each other to form a stack of thermoplastic layers wherein each layer includes a top surface, a bottom surface and an interior and wherein the top surface of any lower thermoplastic layer within said stack is adjacent to the bottom surface of an upper adjacent thermoplastic layer within said stack at spaced locations and displaced away from said bottom surface of said upper adjacent layer at alternate spaced locations, such that said stack of thermoplastic sheets define a honeycomb structure; and a plurality of weld bonds located at said spaced locations throughout said stack of thermoplastic layers, said weld bonds comprising regions of welded plastic, said regions of welded plastic extending from the top surface of an upper thermoplastic layer through the interior and bottom surface of said layer and through only the top surface and interior of an adjacent lower layer, said region of welded plastic not extending through the bottom surface of said adjacent lower layer.

7. A honeycomb structure according to claim 6 wherein the region of welded plastic located in the interior of said lower layer does not extend through more than 95% of the thickness of said interior.

8. A honeycomb structure according to claim 7 wherein the region of welded plastic located in the interior of said lower layer extends through approximately 75% of the thickness of said interior.

9. A honeycomb structure according to claim 6 wherein said thermoplastic layers comprise a thermoplastic selected from the group consisting of polyurethane, vinyl, acrylonitrile butadiene styrene, polypropylene, polyethylene, polyether imide, polyarylene sulfide, polyarylene ether and polyether ether ketone.

10. A honeycomb structure according to claim 9 wherein said thermoplastic layers comprise polyurethane.

* * * * *